United States Patent [19]
Yamamoto et al.

[11] Patent Number: 4,959,603
[45] Date of Patent: Sep. 25, 1990

[54] SOLAR BATTERY EQUIPMENT

[75] Inventors: Shigeo Yamamoto, Kanagawa; Toshio Noda, Hyogo, both of Japan

[73] Assignee: Osaka Titanium Co., Ltd., Tokyo, Japan

[21] Appl. No.: 262,445

[22] Filed: Oct. 25, 1988

[30] Foreign Application Priority Data

Oct. 27, 1987 [JP] Japan ............................ 62-271328
Feb. 16, 1988 [JP] Japan ............................ 63-033590
May 18, 1988 [JP] Japan ............................ 63-121500

[51] Int. Cl.$^5$ ............................................ H02J 7/00
[52] U.S. Cl. ............................ 320/1; 136/291; 136/293; 361/502; 361/503; 361/504; 429/9
[58] Field of Search .............. 429/9, 218; 136/291, 136/293; 361/502-504, 434; 320/1

[56] References Cited

U.S. PATENT DOCUMENTS

| | | | |
|---|---|---|---|
| 4,488,203 | 12/1984 | Muranaka et al. | 361/502 |
| 4,634,953 | 1/1987 | Shoji et al. | 320/1 |
| 4,644,256 | 2/1987 | Farias et al. | 323/299 |
| 4,701,693 | 10/1987 | Nishimura | 323/303 |
| 4,709,200 | 11/1987 | Ochiai | 320/1 |
| 4,714,352 | 12/1987 | Ganter | 368/64 |
| 4,750,099 | 6/1988 | Inoue et al. | 363/62 |

FOREIGN PATENT DOCUMENTS 59-26089 2/1984 Japan ............................ 320/1

OTHER PUBLICATIONS

Kei Sanda et al, "Electric Double Layer Capacitor Super Capacitor", NEC Res. & Dev. (Japan), No. 55, Oct. 1979, pp. 21-28.

Primary Examiner—Aaron Weisstuch
Attorney, Agent, or Firm—Hopgood, Calimafde, Kalil, Blaustein & Judlowe

[57] ABSTRACT

A solar battery system characterized by at least one solar cell for converting light energy to electrical energy which is stored in the system is provided. The solar cell is formed of a semiconductor selected from the group consisting of single crystal, polycrystalline and amorphous substrates and is coupled in parallel to an energy-storage capacitor, which capacitor is also connected in parallel with a loading circuit. The capacitor is formed of compressed particles of activated carbon which stores electrical energy charged to it by the solar cell at a selected voltage level. A diode is coupled in series to an output terminal of said solar cell to prevent the flow of a reverse current to the solar cell during discharge of the capacitor to the loading circuit.

7 Claims, 3 Drawing Sheets

SOLAR BATTERY EQUIPMENT

This invention relates to a solar battery equipment or system comprising at least one solar cell for converting light energy into electrical energy which is stored in the system for subsequent use when needed.

STATE OF THE ART

Solar battery systems are known wherein at least one solar cell is employed in a circuit coupled in parallel to a battery, such as a lead storage battery, a cadmium battery, a dry cell, etc. The life of the battery is prolonged by the continuous supply of power thereto from the solar cell during daylight for present or future use. Thus, the use of the solar cell generator serves to extend the life of a battery upwards of 5 years or more.

It is an object of the invention to provide a battery equipment or system for generating and storing electrical energy without using a conventional battery for the storage medium.

IN THE DRAWINGS

STATEMENT OF THE INVENTION

Figure 1:
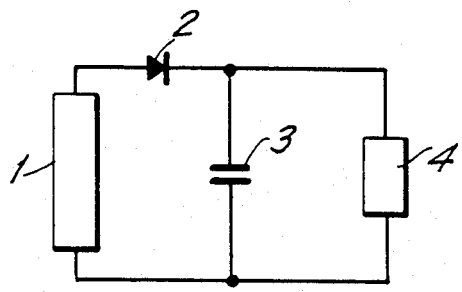
FIG. 1 is a block diagram showing a typical battery free circuit provided by the invention in which electrical energy generated by a solar cell is stored in the system using an energy-storage capacitor coupled to a loading circuit.

Stating it broadly, the invention resides in a solar battery system characterized by at least one solar cell for converting light energy to electrical energy which is stored in the system. The solar cell is formed of a semiconductor selected from the group consisting of single crystal, polycrystalline and amorphous substrates. The solar cell has output terminals connecting said cell in parallel to an energy-storage capacitor, which in turn is also connected in parallel to a loading circuit.

The capacitor is comprised of compressed particles of activated carbon capable of storing electrical energy charged to it by the solar cell for the subsequent gradual discharge thereof to said loading circuit when needed. A diode is coupled in series to an output terminal of said solar cell to prevent the flow of a reverse current to the solar cell.

A preferred construction of the capacitor is one in which the compressed particles of activated carbon are infiltrated or absorbed with a dilute solution of sulfuric acid sufficient to fill the voids between the particles.

It is important that the activated carbon be finely divided to provide a large surface area per gram of carbon. This is achieved in one instance by employing, for example, very small spheres of activated carbon having a diameter of approximately 0.7 um. The size of the particles is preferably such as to provide a specific surface ranging from about 1,000,000 $cm^2$ to 20,000,000 $cm^2$ per gram of activated carbon.

Aqueous solutions of an electrolyte may be employed in combination with the activated carbon. An aqueous solution of sulfuric acid is preferred as the liquid electrolyte since it has a very low resistance, whereby the capacitor is able to provide a relatively high current compared to an electrolyte having a higher resistance. While any concentration of sulfuric acid can be employed, it is preferred that the acid be dilute for safety's sake in case of leakage. Such aqueous solutions may range in concentration up to about 1 normal.

The advantages of the system are that it excludes the use of a conventional battery and enables the storage of electrical power during the day when solar energy is available so that the stored energy can be used after the sun has set. The electrical energy stored in the carbon capacitor can be used for many hours without the use of another electrical source.

The solar cell may be constructed from single crystal, polycrystalline compound, or amorphous semiconductor substrates. They are equally applicable for use as the solar electric generator cell.

However, the polycrystalline semiconductor wafer or substrate is particularly preferred. It is less costly and, moreover, provides a wide range of utility over the temperature of +70° C. and −25 C. In the case of the amorphous semiconductor substrate, the temperature range of utility is more narrow, the temperature ranging from about +35° C. to −10° C. The single crystal semiconductor is more expensive to manufacture.

With regard to the efficiency of converting solar energy to electrical energy, the single crystal cell provides a conversion efficiency of between about 14% and 19%, the polycrystalline cell between about 11% and 14% and the amorphous semiconductor (e.g., silicon) between about 2% and 5%. It should be noted, however, that the amorphous silicon solar cell provides a better light to electrical energy conversion efficiency than those of the single crystal and polycrystalline types when exposed to fluorescent light which is high in ultraviolet energy.

With regard to the capacitor used in carrying out the invention, the construction is literally that of a capacitor and is not a battery. It is not used as a back-up to a battery but is actually substituted for the battery.

The characteristic of the capacitor is its capability of storing electrical energy charged to it by the solar cell generator without requiring the aid of a battery. It is capable of discharging the stored electrical energy for substantially long periods of time, for example, upwards of 12 hours or more, depending upon the requirements of the loading circuit.

The solar cell/capacitor system of the invention is used for moderate power storage and consumption and is not used as a high electrical power source. Moreover, high current storage is not involved. The electromotive force is in the neighborhood of several volts, for example, up to about 10 or 12 volts, more or less, with the current measured in milliamperes, e.g., several or more milliamperes.

The capacitor employed is applicable to transistor circuitry in which the power requirements are small. The voltage output of the capacitor when charged is less than 12 V and the current less than one ampere (i.e., less than 1000 mA).

DETAILS OF THE INVENTION

According to theory, the inside of the capacitor apparently consists of a double layer of plus and minus charges closely facing each other via a contacting area or interface comprised of a solid portion and a liquid portion. This is achieved by contacting the compressed solid particles of activated carbon with dilute sulfuric acid solution, the solution infiltrating the pores or voids between the particles. The details of the construction will be discussed hereinafter.

The capacitor is connected or coupled in parallel with the drive or loading circuit and is capable of delivering the stored electrical power thereto for a prolonged period of time.

Figure 2:
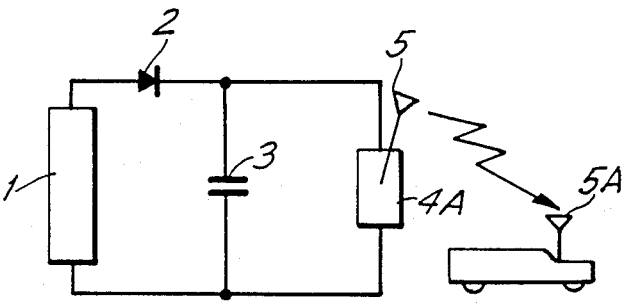
FIG. 2 is similar to FIG. 1 with the exception that the loading circuit is a transmitter.
Figure 3:
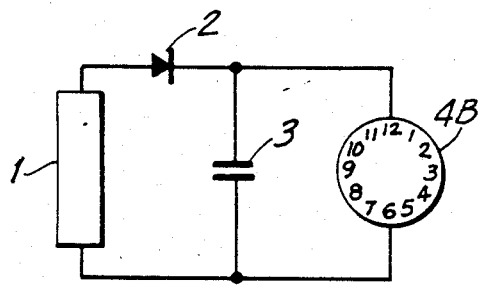
FIG. 3 is another embodiment of the invention in which the loading circuit is a clock.

Referring now to the drawings, FIGS. 1–3 are block diagrams showing the circuit relationship between the solar cell, the capacitor and the drive or loading circuit.

In FIG. 1; the solar electric generator cell is depicted by the numeral 1. The output terminals of the generator are connected in parallel to capacitor 3, diode 2 being series connected to an output terminal of the solar generator to prevent the flow of reverse current to the solar cell. A drive or loading circuit 4 is connected in parallel to capacitor 3.

FIG. 2 is similar to the block diagram of FIG. 1 but differs in that the driving and loading circuit 4A is a transmitter having an antenna 5 for transmitting wave energy to a movable machine 6, such as a mini-toy-car, which has a receiving antenna 5A as shown. As in FIG. 1, this particular solar cell system likewise does not require the use of a separate battery.

The embodiment of the invention shown in FIG. 3 illustrates another type of a loading circuit, in this case a large clock 4B, the remainder of the circuit comprising a solar cell generator 1, a diode 2 and a capacitor 3. The circuit includes a semiconductor clock circuit, a stepping motor and an acoustic circuit enclosed in the clock which is part of the drive circuit. The wave form of the electric current of the stepping motor referred to hereinabove is illustrated in FIG. 4.

Figure 4:
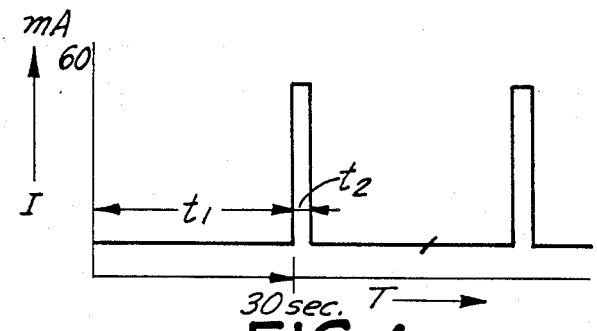
FIG. 4 is a drawing of a wave form illustrating the current employed for driving a stepped motor used in the clock circuit for FIG. 3.

In the graph of FIG. 4, the ordinate is current I in milliamperes and the abscissa is time T. The current shown at $t_2$ is the current to effect forward rotation of the stepping motor discussed with regard to FIG. 3.

The large clock 4B, for example, may have a diameter of 70 cm and a minimum drive potential of about 3.4 volts. A current of about 60 mA is applied for about a time $t_2$ of 0.22 seconds, the clock current being 0.1 mA during a period of $t_1$, of about 29.78 seconds.

The consumption current I (the load current illustrated in FIG. 4) is calculated as follows:

$$I = \frac{0.22}{\frac{60}{2}} \times 60 \text{ mA} + 0.1 \text{ mA} = 0.54 \text{ mA}$$

On the other hand, with respect to FIG. 3, the solar generator comprised 10 cells connected in series which provided at the output terminals thereof a voltage to the load circuit of 5.0 V, while the capacitor 3 exhibited an output voltage of 4.7 V. When the terminals of capacitor 3 were shorted, the output current was 2.0 amperes or 2,000 mA. In accordance with the foregoing electrical properties, the forward resistance of the circuit, i.e., $R_D$, was calculated as follows:

$$R_D = \frac{(5.0 - 4.7)}{2} = 0.15 \Omega$$

The workable period of the solar electric generator cell was measured and found to be 66 hours. This was determined by the following equation:

$$T = \frac{[C(V_1 - V_2]}{I}$$
$$= \frac{[100^F (4.7 - 3.4)]}{0.54 \times 10^{-3}} = 240,741 \text{ secs. or 66 hrs.}$$

where:
C : Capacitor's static capacity (F)
$V_1$: Voltage supplying the capacitor (V)
$V_2$: Latest workable voltage
I : Generator's discharging current (A)

The aforementioned data indicate that the system will operate for close to three days based on the electrical energy accumulated when the solar electric generator or cell is exposed to the sun under a clear sky for about 10 minutes.

The charging period of capacitor 3, that is, the period of the clock starting from the non-workable stage is calculated in accordance with the following equation. The charging period was found to be about 321 seconds or about 6 minutes.

$$t = C[\{R_D + (V_1/i_2)\} \cdot \log\{(1 - (V_c/V_1)\}]$$

where:
C : Capacitor's static capacity (F)
$R_D$: Diode's forward resistance ( )
$V_1$: Capacitor's supplied voltage (V)
$V_c$: Capacitor's terminal voltage (V)
$i_2$: Capacitor's current (A)
$i_1$: Load current (A)
$i_2$: I—$i_1$ then:

$$t = 100[0.15 + 4.7/(2 - 0.54 \times 10^{-3})] \cdot \log[1 - (3.4/4.7)]$$

t = 321 secs. (However, in $V_c$ = 3.4 V)

Figure 6:
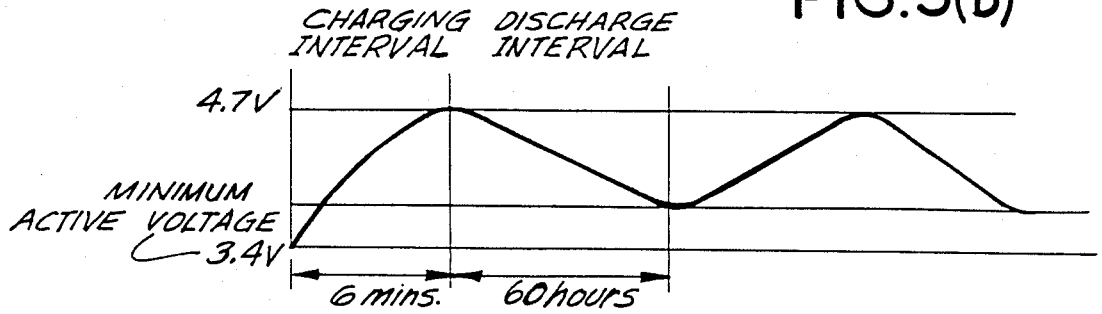
FIG. 6 is a graphical representation of the charge and discharge characteristics of the capacitor shown in FIGS. 1-3 and 5.

The aforementioned relationship is illustrated by FIG. 6. The data calculated above are based on measurements taken under a clear sky. Where the measurements were obtained under a cloudy sky, the values of each were as follows:

The current of the capacitor when started was 1,000 mA (or 1 A)
The open voltage of the capacitor was 3.7 V
The minimum sunshine period was 3.6 hrs.

Figure 5A:
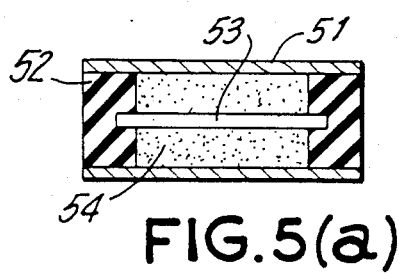
FIG. 5A is a cross section of the capacitor shown in FIGS. 1-3 in which particles of activated carbon are employed as a main ingredient of the capacitor.

FIG. 5(a) depicts the structure of the capacitor in cross section comprising envelope parts 52 of compound rubber or similar material, electrodes 51 made of material resistant to acid corrosion, such as aluminum or a corrosion resistant alloy, or other material, such as electroconductive rubber. Within the capacitor body bounded by electrodes 51 and envelope parts 52, a separator 53 is provided made of a multi-holed or porous organic film. The body of the capacitor is filled with an electric storage material 54 comprised of closely packed or compressed particles of active carbon with the interstices thereof infiltrated with a dilute solution of sulfuric acid. The amount of sulfuric acid is just sufficient to penetrate the compressed active carbon particles. The capacitor is charged by an electric current through electrodes 51. The voltage level is maintained by virtue of the electrolysis in the carbon/sulfuric acid composition of the capacity which provides electric double layers within the capacitor. In order to obtain the appropriate voltage, several solar cells in series may be used.

Figure 5B:
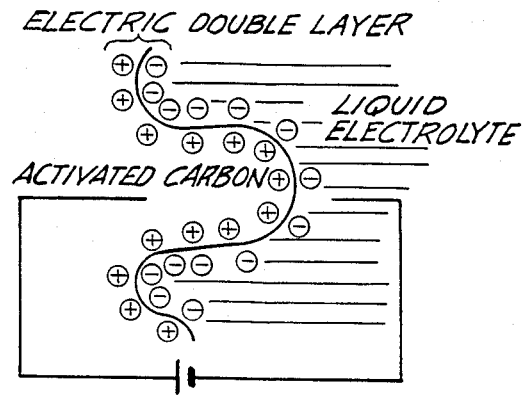
FIG. 5B is a schematic illustrating in theory the alignment of ions within the internal structure of the capacitor.

FIG. 5(b) illustrates in theory the alignment of ions in the solid and liquid phases within the capacitor after it has been charged by an outside source of power. The chemical equation showing the ionization of sulfuric acid is given as follows:

$$H_2SO_4 + H_2O \rightarrow H_3O^+ + HSO_4^-$$

Prior to charging of the capacitor, the ions are believed to be randomly oriented but form an electric double layer following charging. However, it is to be understood this is only a theory.

Figure 8:
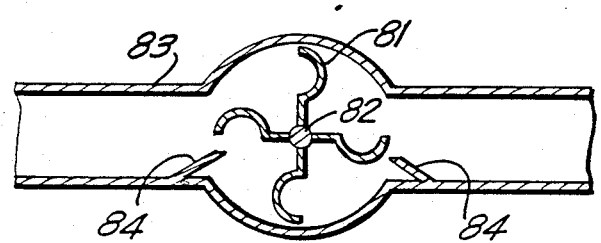
Figure 9:
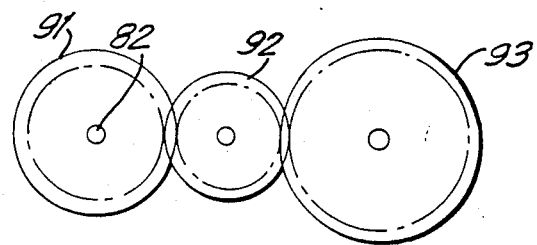

The static capacitor is defined as:

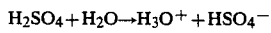

where:
C: Static capacitor
S: Area of electrodes
d: Thickness of the static body As shown in FIG. 8, the flow meter comprises a rotating member with wings or blades 81 joined to and extending radially from an axial member or shaft 82, the rotating member being supported within an enclosure which communicates with tube 83 through which a fluid, such as air or liquid, flows. In order to protect against reverse flow, a petal or baffle 84 may be employed mounted as shown.

In accordance with known practice, several gears may be employed as a gear train to show the amount of material flowing through tube 83, the drive gear 91 being axially mounted to axial member or shaft 82. The first gear, e.g., gear 91 would actuate the units numerals 0 to 9, the second gear, e.g., 92 would actuate the tens numerals 10-99, the third gear the hundreds numerals 100 to 999, and so on.

A disadvantage of using a mechanically rotatable gear train is that it generally requires relatively high power input. Also some flow leakage is apt to occur, so that precise measurements are not always obtainable.

FIGS. 7-10 illustrate the practical aspects of the invention in which the loading or drive circuit is either a gas or liquid flow meter.

Figure 7:
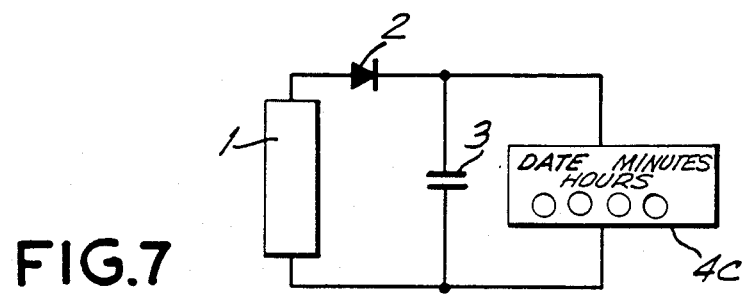
FIGS. 7-10 are block diagrams depicting the use of a flow meter device in the loading circuit.

In FIG. 7, 4C is the drive circuit which is shown as a display device on which is recorded the date, hours and minutes. The drive circuit includes a transistor LSI semiconductor chip or chips (not shown) which operates at or less than 6 volts. A preferred circuit is a CMOS circuit which operates at or less than 3 volts. A Liquid Crystal Device (LCD) may be preferred as the display means since it can operate on a low drive voltage or current.

Figure 10:
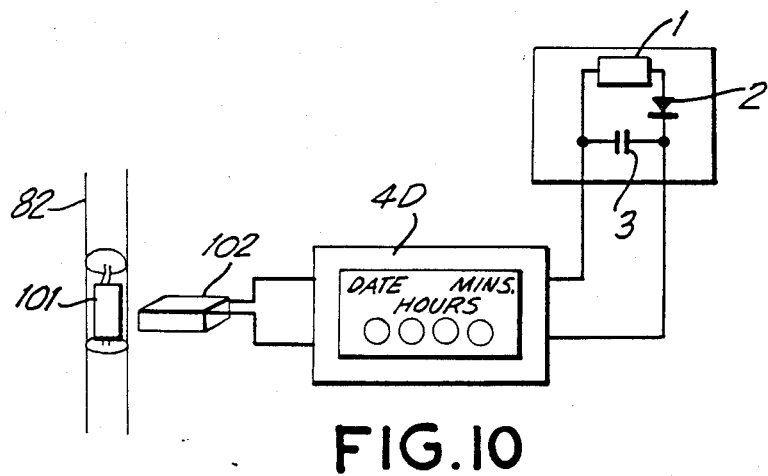

In FIG. 7 and FIG. 10, the solar battery generator or cell 1 is shown with its output terminals coupled to capacitor 3 with diode 2 series connected to an output terminal of the solar cell. The circuits illustrated are particularly applicable to transistor circuits which are preferred since only several volts as well as several milliamperes are required, especially when operating continuously over a 24-hour period.

The embodiment of FIG. 10 overcomes the foregoing disadvantages in that a gear train is avoided. The device shown in FIG. 10 can operate at low power, i.e., at several volts and several milliamperes.

As shown in FIG. 10, this achieved by enclosing a magnet 101 in a portion of axial member 82 which member is caused to rotate by the flow of fluid against wings or blades 81 (FIG. 8). A sensor 102 is provided for detecting the magnetic force emanating from rotating magnet 101 which is easily converted to a digital read out at display 4D without requiring a high power input. A small change in the magnetic field is converted to the corresponding analog value by virtue of the transistor LSI in the display device. This embodiment provides an easily workable flow meter at 6 volts and 3 milliamperes of power and can operate all day and all night and provide correct readings.

It will be appreciated that there will be situations in which a relatively high current would be required but which the capacitor may not always be able to maintain due to its voltage, particularly where the voltage of the capacitor varies from a high of 6 volts to a low of 3 volts. It is desirable that the system of the invention operate in a manner similar to that provided with a load circuit operated by a dry cell, for example, where the load circuit is a transistor radio, a table calculator, a liquid display device, and other types of loading circuits.

A case in point is a small scale tape or low power recorder which operates at 1.5 volts and a power input of 0.27 watts (0.18 ampere) to rotate the tape mechanism, or a transistor radio which operates at a power input of 0.066 watts (0.044 ampere).

With regard to the small tape recorder, the rotation mechanism may cease to operate when the voltage drops from 1.5 to 1.1 volts. In the case of the transistor radio, the sound or audio circuit may likewise cease to function when the voltage drops from one 1.5 to 1.1 volts.

Figure 11:
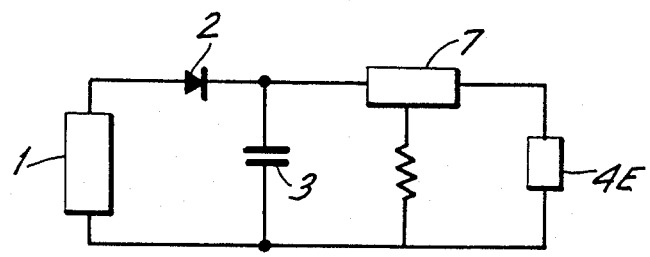
FIGS. 11 and 12 illustrate the use of a variable impedance for controlling the power fed to the loading circuit.
Figure 12:
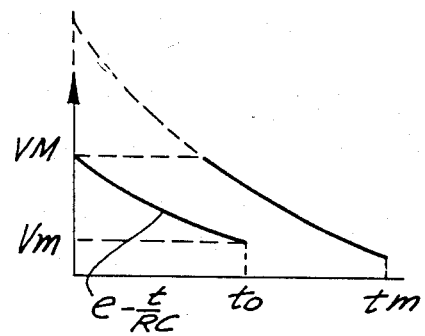
Figure 13:
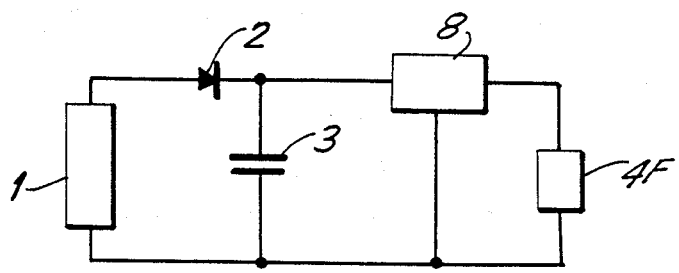
FIG. 13 is similar to FIG. 11 except that a DC-DC regulator is used in place of the variable impedance.

To avoid the foregoing problems from occurring when using the invention, the solar power generating system may be modified as shown in FIG. 11 to 13.

FIG. 11 illustrates a system in which a voltage regulator, e.g., a variable impedance 7, is employed inserted between the capacitor circuit 3 and the load circuit 4E. The circuit also includes a rectifier 2 to prevent reverse current from flowing to the solar battery generator 1. The impedance can thus be varied to a large resistance when the voltage from the capacitor is high and to a small resistance when the voltage is low.

Referring to the curves of FIG. 12, it will be noted that the downward curve of the loading voltage varying from the upper limit VM to the lower limit VM provides flexibility of operation of the loading circuit over a longer period of time without shut-off of the power to the loading circuit.

The embodiment of FIG. 13 achieves the same result using a voltage regulator in the form of a DC-DC regulator 8 between the capacitor circuit and the loading circuit 4F. By inserting the DC-DC regulator 8, the voltage of capacitor 3 can be elevated to its maximum capable voltage (e.g., 6 volts) which is far above the voltage of the load transistor. However, the voltage is maintained at a lower voltage setting to provide a moderate voltage (or constant current) to the load transistor. This is illustrated at the right side portion of the downward curve of FIG. 12 which shows application of power to the loading circuit for a longer period of time. Thus, the transistor radio, the table calculator and display devices are capable of operating for upwards of 24-hours or more without stopping.

In summary, the loading circuits described hereinabove and others not mentioned can be operated by solar energy per se without using secondary batteries, particularly by using a capacitor preferably containing compressed activated carbon particles with the interstices thereof infiltrated with dilute sulfuric acid. The system of the invention is capable of use in any part of the world in which sun energy is available, for example, at the top of a mountain, while travelling on sea or rivers or on the desert and even in outer space, without requiring the use of a secondary battery as a back-up source of power.

Although the present invention has been described in conjunction with preferred embodiment, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A solar battery system characterized by at least one solar cell for converting light energy to electrical energy which is stored in the system for use when light energy is not available, said solar battery system consisting essentially of:
    at least one solar cell formed of a semiconductor selected from the group consisting of single crystal and polycrystalline substrates,
    said solar cell having output terminals connecting said cell in parallel to an energy-storage capacitor, which capacitor is also connected in parallel with a loading circuit,
        said capacitor being formed of compressed particles of activated carbon of particle size sufficient to provide a specific surface of about 1,000,000 to 20,000,000 cm$^2$ per gram of activated carbon with voids between said particles having absorbed therein an aqueous solution of sulfuric acid, said capacitor being capable of storing electrical energy charged to it by said solar cell at a selected voltage level for the gradual discharge of said capacitor to said loading circuit when needed,
    a diode coupled in series to an output terminal of said solar cell to prevent the flow of reverse current to said solar cell, and
    a variable voltage regulator disposed between said capacitor and said loading circuit to maintain the power fed to said loading circuit from said capacitor substantially constant.

2. The solar battery system of claim 1, wherein the variable voltage regulator is selected from the group consisting of a variable impedance and a DC-DC voltage regulator.

3. The solar battery system of claim 1, wherein the voltage output of said charged capacitor when charged is less than 12 volts and the current is less than 1 ampere.

4. A solar battery system characterized by at least one solar cell for converting light energy to electrical energy which is stored in the system, said solar battery system consisting essentially of:
    at least one solar cell formed of a semiconductor selected from the group consisting of single crystal and polycrystalline substrates,
    said solar cell having output terminals connecting said cell in parallel to an energy-storage capacitor, which capacitor is also connected in parallel with a loading circuit,
        said capacitor being formed of compressed particles of activated carbon of particle size sufficient to provide a specific surface of about 1,000,000 to 20,000,000 cm$^2$ per gram of activated carbon with an aqueous solution of sulfuric acid absorbed therein, said capacitor being capable of storing electrical energy charged to it by said solar cell at a selected voltage level for the gradual discharge of said capacitor to said loading circuit when needed,
    a diode coupled in series to an output terminal of said solar cell to prevent the flow of reverse current to said solar cell, and
    a variable impedance element disposed between said capacitor and said loading circuit to maintain the power fed to said loading circuit from said capacitor substantially constant.

5. The solar battery system of claim 4, wherein the voltage output of said capacitor when charged is less than 12 volts and the current less than one ampere.

6. A solar battery system characterized by at least one solar cell for converting light energy to electrical energy which is stored in the system, said solar battery system consisting essentially of:
    at least one solar cell formed of a semiconductor selected from the group consisting of single crystal and polycrystalline substrates,
    said solar cell having output terminals connecting said cell in parallel to an energy-storage capacitor, which capacitor is also connected in parallel with a loading circuit,
        said capacitor being formed of compressed particles of activated carbon of particle size sufficient to provide a specific surface of about 1,000,000 to 20,000,000 cm$^2$ per gram of activated carbon with an aqueous solution of sulfuric acid absorbed therein said capacitor being capable of storing electrical energy charged to it by said solar cell at a selected voltage level for the gradual discharge of said capacitor to said loading circuit when needed,
    a diode coupled in series to an output terminal of said solar cell to prevent the flow of reverse current to said solar cell, and
    a variable DC-DC voltage regulator disposed between said capacitor and said loading circuit to maintain the power fed to said loading circuit from said capacitor substantially constant.

7. The solar battery system of claim 6, wherein the voltage output of said capacitor when charged is less than 12 volts and the current less than one ampere.

* * * * *